US007897131B2

(12) United States Patent
Kang et al.

(10) Patent No.: US 7,897,131 B2
(45) Date of Patent: Mar. 1, 2011

(54) NITROGEN-MEDIATED MANUFACTURING METHOD OF TRANSITION METAL-CARBON NANOTUBE HYBRID MATERIALS

(75) Inventors: Jeung-Ku Kang, Daejeon (KR); Seong-Ho Yang, Daejeon (KR); Hyun-Seok Kim, Daejeon (KR); Kyu-Sung Han, Daejeon (KR); Se-Yun Kim, Daejeon (KR); Jung-Woo Lee, Daejeon (KR); Weon-Ho Shin, Daejeon (KR); Jun-Hyeon Bae, Daejeon (KR)

(73) Assignee: Korea Advanced Institute of Science and Technology, Daejeon (KR)

( * ) Notice: Subject to any disclaimer, the term of this patent is extended or adjusted under 35 U.S.C. 154(b) by 774 days.

(21) Appl. No.: 11/878,155

(22) Filed: Jul. 20, 2007

(65) Prior Publication Data
US 2008/0102015 A1    May 1, 2008

(30) Foreign Application Priority Data
Oct. 31, 2006   (KR) .......................... 10-2006-0106741

(51) Int. Cl.
*D01F 9/12* (2006.01)
*H01B 1/16* (2006.01)

(52) U.S. Cl. .................... 423/447.1; 423/447.3; 423/460; 252/503

(58) Field of Classification Search ............... 423/447.1, 423/445 B; 977/742–754, 842–848; 502/416–438; 252/502–503
See application file for complete search history.

(56) References Cited

OTHER PUBLICATIONS

Lee, et al., Growth of Vertically Alligned Nitrogen-Doped Carbon Nanotubes: Control of the Nitrogen Content over the Termperature Range 900-1100C, J. Phys. Chem. B 2003; 107: 12958-12963.*

Li, et al., Microwave polyol synthesis of Pt/CNTs catalysts: Effects of pH on particle size and electrocatalytic activity for methanol electrooxidization, Carbon 2005; 43: 2168-2174.*

Zhang, Y., et al., "Formation of metal nanowires on suspended single-walled carbon nanotubes", *Applied Physics Letters*, vol. 77, No. 19, pp. 3015-3017, (2000).

Quinn, B.M., et al., "Electrodeposition of Noble Metal Nanoparticles on Carbon Nanotubes", *J. Am. Chem. Soc.*, vol. 127, pp. 6146-6147, (2005).

Che, G., et al., "Carbon nanotubule membranes for electrochemical energy storage and production", *Nature*, vol. 393, pp. 346-349, (1998).

* cited by examiner

*Primary Examiner* — Stuart L. Hendrickson
*Assistant Examiner* — Daniel C. McCracken
(74) *Attorney, Agent, or Firm* — The Nath Law Group; Jerald L. Meyer; Sungyeop Chung

(57) ABSTRACT

The present invention relates to a method for manufacturing a transition metal-carbon nanotube hybrid material using nitrogen as a medium. The present invention is characterized in that nitrogen-added carbon nanotube is grown in the presence of metal catalyst particles by reacting an hydrocarbon gas with a nitrogen gas by a chemical vapor deposition (CVD) and a transition metal-carbon nanotube hybrid material where a transition metal is uniformly attached to the entire carbon nanotube structure in which nitrogen with a great chemical reactivity is added as heterogeneous elements is chemically manufactured. Therefore, the present invention does not use an acid treatment required to attach transition-metal atoms to the carbon-nanotube, a surface treating process using a surfactant and the like and an inhibitor for preventing the coagulation of the transition metal so that a simplification of the process is obtained and the method is an environment-friendly method. The transition metal-carbon nanotube hybrid material manufactured by the above can be applied variously as a hydrogen storage material, a catalyst material, an electric field emission device and an electrode material.

14 Claims, 4 Drawing Sheets

NITROGEN-MEDIATED MANUFACTURING METHOD OF TRANSITION METAL-CARBON NANOTUBE HYBRID MATERIALS

CROSS-REFERENCE TO RELATED APPLICATIONS

The present invention claims priority to Korean Patent Application No. 2006-106741 filed on Oct. 31, 2006, which is incorporated herein by reference in its entirety.

BACKGROUND OF THE INVENTION

1. Field of the Invention

The present invention relates to methods for manufacturing a transition metal-carbon nanotube hybrid material, and more particularly, to a method for manufacturing a transition metal-carbon nanotube hybrid material using a highly reactive nitrogen present in a carbon nanotube as a medium without using additional surface treatment or inhibitors.

A carbon nanotube has a nanotube-structural material having excellent thermal, mechanical and electrical characteristics and draws an attention as a material applicable in various fields. Furthermore, in case that a transition metal is attached to a carbon nanotube, it may be used as a hybrid material capable of improving the characteristics owned by the carbon nanotube itself or expressing new characteristics. When it comes to the application of the transition metal-carbon nanotube hybrid material, it is known to be used as a gas sensor, a hydrogen storage material, a catalyst material, an electron emitter, a composite material for structure and a nano device. In manufacturing such transition metal-carbon nanotube hybrid material, it is important to uniformly distribute the transition metals with well controlled sizes.

2. Description of the Related Art

The conventional methods for manufacturing transition metal-carbon nanotube hybrid materials include a method using a metal steam, (Y. Zang et. al., Appl. Phys. Lett., 77, 3015, 2005), an electric chemical plating (B. N. Quinn et. al., J. Am. Chem. Soc., 127, 6146, 2005) and a method for attaching a metal salt to the surface of carbon nanotube and reducing it (G. Che et. al., Nature, 393, 346, 1997). The method using metal stem requires a high production cost and is difficult to obtain a uniform distribution. In an electric chemical plating method and a method reducing a metal salt, a carbon nanotube is chemically safe so that a process for activating the outer wall of the carbon nanotube is included in both methods and it is difficult to control the size of a transition metal nano particle because of just resulting in the transition nano particle above 5 nm, therefore inhibitors are often used. In light of a real application, both methods show limitations in time and costs. Moreover, because the solution used in the activation process has a strong oxidation characteristic, the carbon nanotube may be severely damaged and is not the environment-friendly.

SUMMARY OF THE INVENTION

Accordingly, the present invention has been made keeping in mind the above problems occurring in the related art, and an object of the present invention is to provide with a method for simply manufacturing a transition metal-carbon nanotube hybrid material where nano particles having controlled sizes are uniformly distributed using nitrogen with a high activity as a medium by replacing carbon with nitrogen when manufacturing a carbon nanotube without additional surface treatments or inhibitors.

In order to achieve the above object, the present invention provides with a method for manufacturing a transition metal-carbon nanotube hybrid material by reducing a transition metal by a reduction reaction in a solution containing the carbon nanotube containing nitrogen and a transition metal salt.

Moreover, the present invention provides with a method for manufacturing a transition metal-carbon nanotube hybrid material, the method comprising: dispersing carbon nanotube containing nitrogen to a reductive solvent containing a transition metal salt; and reducing the transition metal salt.

In addition, the present invention provides with a method for manufacturing a transition metal-carbon nanotube hybrid material, the method comprising: adding a transition metal salt to a reductive solvent where the carbon nanotube containing nitrogen is dispersed; and reducing the transition metal salt.

Furthermore, the present invention provides with a method for manufacturing an oxidized transition metal-carbon nanotube hybrid material, the method comprising: manufacturing a transition metal-carbon nanotube hybrid material by reducing the transition metal by a reduction reaction; and oxidation-treating the transition metal-carbon nanotube hybrid material.

DETAILED DESCRIPTION OF THE INVENTION

Figure 1:
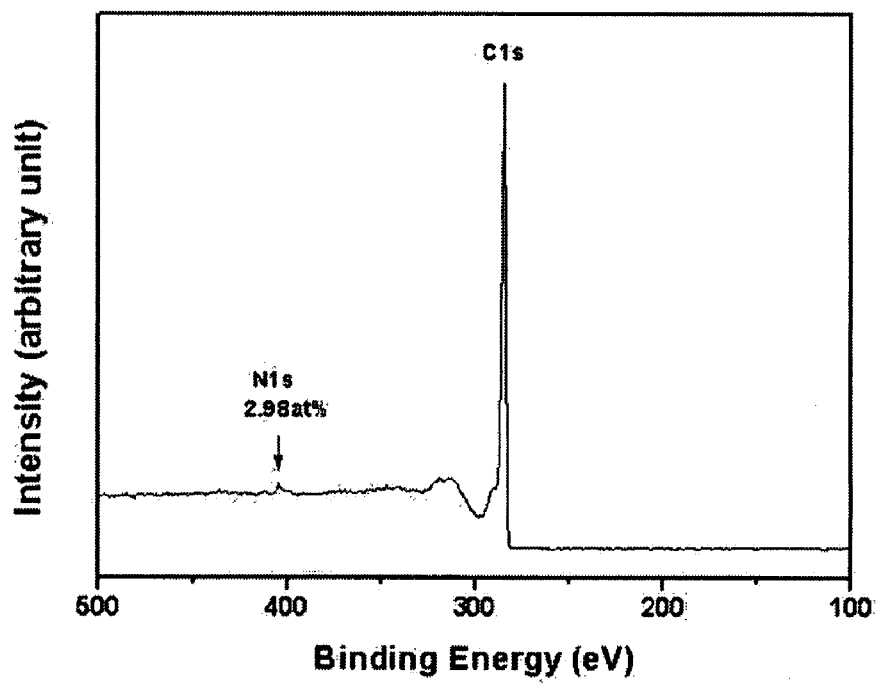
FIG. 1 is an XPS view showing the content of nitrogen of the carbon nanotube added by nitrogen manufactured by a plasma chemical vapor deposition method.

Hereinafter, the contents of the present invention now will be described in detail.

The transition metal-carbon nanotube hybrid material according to the present invention is characterized by that metal ions of the added metal salt are formed on the surface of carbon nanotube via a reduction reaction without a pretreatment and inhibitors using nitrogen present in the carbon nanotube as a medium.

The nitrogen-added carbon nanotube according to the present invention may be manufactured by reacting a hydrocarbon gas with a nitrogen gas in the presence of a metal catalyst by a plasma chemical vapor deposition (CVD) method. The content of nitrogen in the above carbon nanotube is 0.01 to 20 at %. Any metal catalyst may be used only if it can perform a catalytic reaction when the carbon nanotube is formed. For an example of metal catalysts, one of cobalt (Co), Iron (Fe), Nickel (Ni) or a metal compound including the metal can be used as a metal source. At this time, a plasma deposition method may use a microwave or a RF or DC power source as a source.

In one embodiment of the invention, 10~90(v/v) % hydrocarbon and 10~90(v/v) % nitrogen gas can be reacted in the presence of a metal catalyst.

In another embodiment of the invention, a hydrocarbon gas and a nitrogen gas may be supplied to a metal catalyst individually so that the hydrocarbon gas of the entire gas becomes 1~99% and the nitrogen gas becomes 1~99% in volume ratio at the time of reaction in the presence of a metal catalyst.

The transition metal-carbon nanotube hybrid material according to the present invention may be manufactured via a reduction reaction that the carbon nanotube manufactured by the above method is digested in a polyol solution and then is immersed by a ultrasonic wave and a reducing agent and a metal salt are added to be heated in a microwave oven.

At this time, ethylene glycol, diethylene glycol, polyethylene glycol, 1,2-propane diol, dodecane diol and their mixture may be used and ethylene glycol is preferred. The usable metal salts including transition metals are not specifically limited to certain metal salts, and acetate and chloride series etc. may be used as the metal salts. In accordance with the characteristics of the present invention that metal particles are uniformly distributed on a carbon nanotube, the amount of used metal salts can be changed variously depending on the purpose.

The transition metal-carbon nanotube hybrid material obtained in accordance with the present invention may be manufactured into a transition metal oxide-carbon nanotube hybrid material through a simple oxidation process. The above oxidized hybrid material shows p-type semiconductor characteristics of a transition metal nano particle and has good effects on application fields such as, a smart window, a super capacitor, photocathode, and the like. The oxidation process may be generally performed by a thermal heating process under an oxygen atmosphere at about 300° C.

DESCRIPTION OF THE PREFERRED EMBODIMENTS

A better understanding of the present invention may be obtained in light of the following examples which are set forth to illustrate, but are not to be construed to limit the present invention.

Embodiment

Manufacturing a Transition Metal-Carbon Nanotube Hybrid Material

A catalyst for growing $C_{1-x}N_x$ nanotube was manufactured by a magnetron RF sputtering method.

At this time, a $SiO_2$/Si substrate was used as a substrate and cobalt (Co) was deposited at a deposition temperature of 200° C. and a pressure at 15 Torr in Argon (Ar) atmosphere. At the time of deposition, the RF power was set to 100 W and the thickness of the cobalt deposited on the substrate was set to 7 nm.

In order to form a cobalt (Co) layer deposited on the substrate as a catalyst particle, a plasma treatment was performed for one minute with a microwave power of 700 W in a microwave enhanced CVD equipment.

If cobalt particles are formed on a substrate, a substrate on which the cobalt particles are formed is placed in a chamber and 15% methane ($CH_4$) and 85% nitrogen ($N_2$) are supplied to the chamber respectively and a plasma reaction is performed. Therefore, nitrogen-added carbon nanotube was manufactured. At this time, the temperature inside the chamber was set to 750° C., the pressure was maintained at 21 Torr and the microwave power was set to 700 W when a plasma reaction was performed for 20 minutes.

As a result of analyzing the content of nitrogen of the manufactured carbon nanotube using XSP, it was 2.98 at % as shown in FIG. 1.

The 5 g nitrogen-added carbon nanotube was added into 50 ml ethylene glycol solution and was dispersed using a ultrasonic wave.

In the present embodiment, Ni was adopted as an example of a transition metal and 1 ml of 10 mM $Ni(CH_3COO)_2 \cdot 4H_2O$ ethylene glycol solution was used. 8 mg NaOH was used as a reducing agent.

The metal salt and the reducer were added and heated in a microwave oven for 90 seconds to reduce a metal salt. Then, the dispersion liquid was centrifuged at 4500 rpm for 15 minutes and dried in vacuum at 60° C. and then heat-treated in an hydrogen atmosphere at 300° C. to manufacture a Ni-carbon nanotube hybrid material.

Figure 2A:
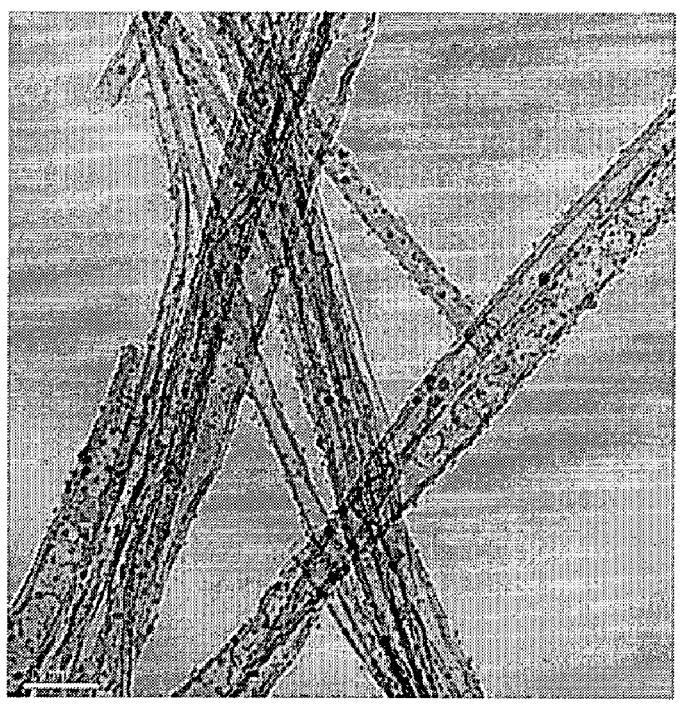
FIG. 2A is a view showing a TEM picture of a Ni-carbon nanotube hybrid material formed by Ni nano particles with uniform distribution and magnitude manufactured using a nitrogen-added carbon nanotube.

FIG. 2A is a TEM picture of a Ni-carbon nanotube hybrid material manufactured in the above embodiment. As shown in the TEM image, it is known that the Ni metal particles have a very uniform distribution and regular sizes.

Figure 2B:
FIG. 2B is a view showing a TEM picture of a Ni-carbon nanotube hybrid material manufactured using a carbon nanotube where nitrogen is not added.

FIG. 2B is a TEM picture of a Ni-carbon nanotube hybrid material manufactured using carbon nanotube where nitrogen is not added via the same reduction method and it is known that they have a very non-uniform distribution.

Figure 3A:
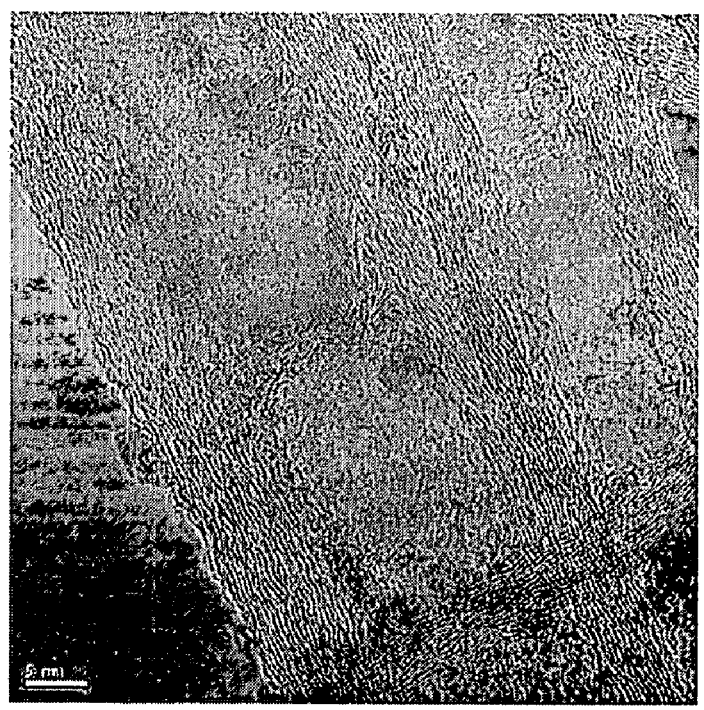
FIG. 3A is a view showing a HRTEM picture of a Ni-carbon nanotube hybrid material using a nitrogen-added carbon nanotube.
Figure 3B:
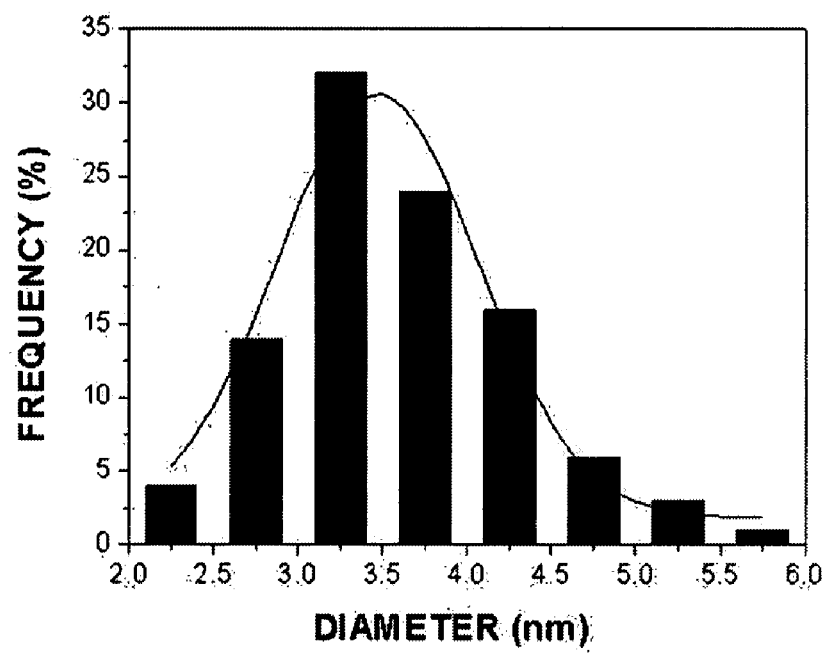
FIG. 3B is a view showing a histogram with respect to the distribution of magnitudes of Ni nano particles which are uniformly distributed on the surface of a nitrogen-added carbon nanotube.

FIG. 3A is a HRTEM picture of a Ni-carbon nanotube hybrid material manufactured using nitrogen-added carbon nanotube and it is known that they have uniform sizes. A histogram of the sizes of Ni nano particles using the HRTEM picture shown in FIG. 3A was prepared in FIG. 3B and Ni nano particles have diameters of 3 to 4 nm mostly and show a uniform distribution in sizes.

Figure 4A:
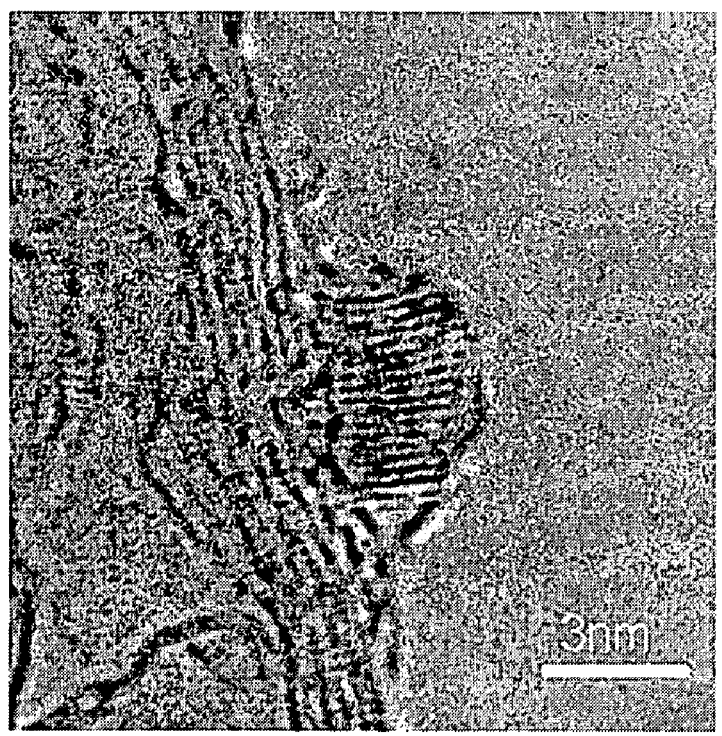
FIG. 4A is a view showing a HRTEM picture of Ni nano particles in Ni-hydrocarbon nanotube hybrid material using a nitrogen-added carbon nanotube.
Figure 4B:
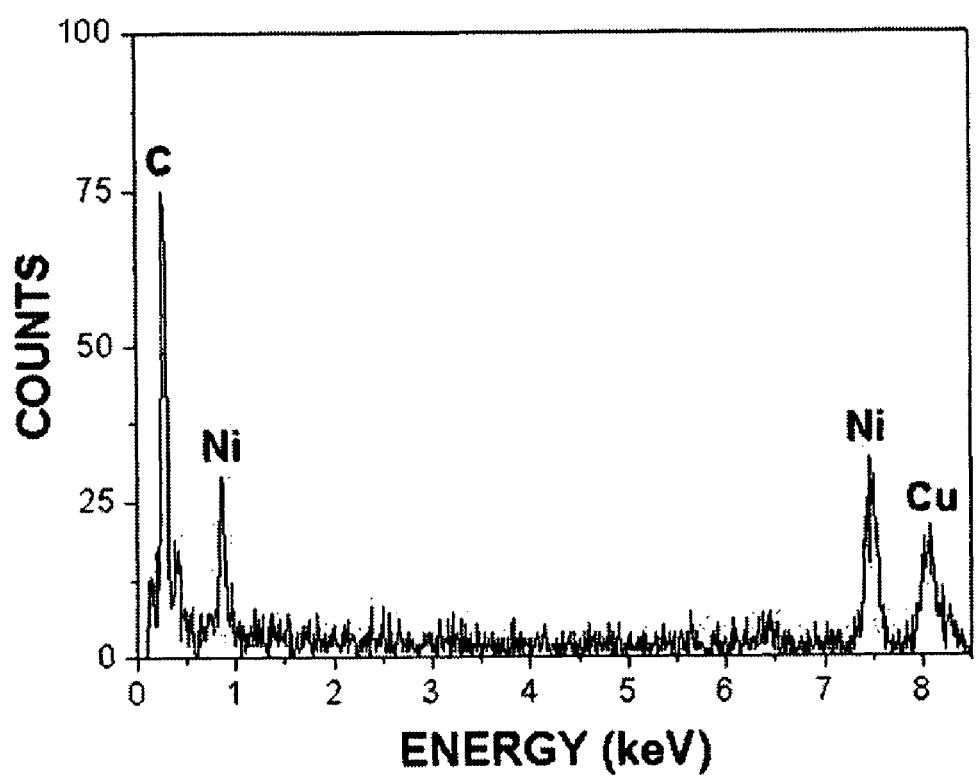
FIG. 4B is a view showing the results of an EDX analysis of Ni nano particles of FIG. 4A.

FIG. 4A is a view showing a HRTEM picture of Ni nano particles of a Ni-carbon nanotube hybrid material manufactured using a nitrogen-added carbon nanotube, and it is known that they are firmly attached onto a carbon nanotube wall and are not Ni oxides through an EDX analysis of FIG. 4B. The oxides may be manufactured through a simple oxidation process.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

As described above, it is possible to simply manufacture a transition metal-carbon nanotube hybrid material where nano particles having controlled sizes are uniformly distributed using nitrogen with a great activity as a medium by replacing carbon with nitrogen, without an additional surface treatment or inhibitors when manufacturing carbon nanotube. Therefore, it has a cost reducing effect resulted from the simplification of processes due to the omission of pretreatment processes and is also very preferable in view of the environment.

Moreover, transition metal nano particles are uniformly distributed on the surface of a carbon nanotube so that it has a great industrial utility in application fields such as a gas sensor, a hydrogen storage material, a catalyst material, an electron emitter, a composite material for structure and nano elements.

What is claimed is:

1. A method for manufacturing a transition metal-carbon nanotube hybrid material, the method consisting of reducing a transition metal by a reduction reaction in a solution containing the carbon nanotube containing nitrogen and a transition metal salt,
wherein the concentration of the transition metal salt is controlled to control the size of a transition metal nano particle.

2. The method as set forth in claim 1, wherein the content of nitrogen in carbon nanotube is 0.01 to 20 at %.

3. The method as set forth claim 1, wherein the solvent constituting a solution is polyol.

4. The method as set forth in claim 3, wherein the polyol is at least one selected from the group consisting of ethylene glycol, diethylene glycol, polyethylene glycol, 1, 2 propane diol and dodecane diol.

5. The method as set forth in claim 1, wherein the transition metal salt is an acetate or chloride salt.

6. The method as set forth in claim 1, wherein the carbon nanotube containing nitrogen is manufactured by reacting a hydrocarbon gas with a nitrogen gas by a chemical vapor deposition (CVD) in the presence of a metal catalyst.

7. The method as set forth in claim 6, wherein the gas used in a reaction comprises said hydrocarbon gas, at 1 to 99% and said nitrogen gas, at 1 to 99% in a volume ratio.

8. A method for manufacturing an oxidized transition metal-carbon nanotube hybrid material, the method consisting of:
manufacturing a transition metal-carbon nanotube hybrid material by reducing the transition metal by a reduction reaction in a solution containing the carbon nanotube containing nitrogen and a transition metal salt; and
oxidation-treating the transition metal-carbon nanotube hybrid material,
wherein the concentration of the transition metal salt is controlled to control the size of a transition metal nano particle.

9. The method as set forth in claim 8, wherein the content of nitrogen in carbon nanotube is 0.01 to 20 at %.

10. The method as set forth claim 8, wherein the solvent constituting a solution is polyol.

11. The method as set forth in claim 10, wherein the polyol is at least one selected from a group consisting of ethylene glycol, diethylene glycol, polyethylene glycol, 1,2 propane diol and dodecane diol.

12. The method as set forth in claim 8, wherein the transition metal salt is an acetate or chloride salt.

13. The method as set forth in claim 8, wherein the carbon nanotube containing nitrogen is manufactured by reacting a hydrocarbon gas with a nitrogen gas by a chemical vapor deposition (CVD) in the presence of a metal catalyst.

14. The method as set forth in claim 13, wherein the gas used in a reaction comprises said hydrocarbon gas, at 1 to 99% and said nitrogen gas, at 1 to 99% in a volume ratio.

\* \* \* \* \*